(12) United States Patent
Voth et al.

(10) Patent No.: US 8,894,910 B2
(45) Date of Patent: Nov. 25, 2014

(54) METHOD AND DEVICE FOR RECYCLING COMPRESSED GAS

(75) Inventors: Klaus Voth, Obertraubling-piesenkofen (DE); Stefan Rossmann, Bad Abbach (DE)

(73) Assignee: Krones AG, Neutraubling (DE)

( * ) Notice: Subject to any disclaimer, the term of this patent is extended or adjusted under 35 U.S.C. 154(b) by 401 days.

(21) Appl. No.: 13/407,812

(22) Filed: Feb. 29, 2012

(65) Prior Publication Data

US 2012/0227825 A1     Sep. 13, 2012

(30) Foreign Application Priority Data

Mar. 7, 2011   (DE) .................. 10 2011 005 189

(51) Int. Cl.
| | | |
|---|---|---|
| B29C 49/62 | (2006.01) | |
| B29C 49/42 | (2006.01) | |
| B29C 49/06 | (2006.01) | |
| B29C 49/12 | (2006.01) | |
| B29C 49/36 | (2006.01) | |

(52) U.S. Cl.
CPC ............ B29C 49/4284 (2013.01); *B29C 49/06* (2013.01); *B29C 49/12* (2013.01); *B29C 49/36* (2013.01)
USPC ............ 264/529; 425/530; 417/250; 137/563

(58) Field of Classification Search
CPC .................................................. B29C 49/4284
USPC ................ 137/563, 565.29, 565.3, 565.33; 60/407; 417/250; 264/529; 425/530, 425/535
See application file for complete search history.

(56) References Cited

U.S. PATENT DOCUMENTS

| | | | | | |
|---|---|---|---|---|---|
| 1,017,835 | A | * | 2/1912 | Wilkinson ................. | 137/563 |
| 3,825,386 | A | * | 7/1974 | Bello et al. ................. | 425/150 |
| 4,394,333 | A | * | 7/1983 | Fukushima et al. ........ | 425/535 |
| 4,488,863 | A | * | 12/1984 | Collette ..................... | 425/530 |
| 5,173,241 | A | * | 12/1992 | Shibuya et al. ............. | 264/572 |
| 5,565,165 | A | * | 10/1996 | Matsuhashi ................ | 264/526 |
| 5,817,348 | A | * | 10/1998 | Ikeda ......................... | 425/529 |
| 7,240,692 | B2 | * | 7/2007 | Parkkinen .................. | 137/563 |
| 7,790,097 | B2 | * | 9/2010 | Litzenberg et al. ......... | 425/529 |

(Continued)

FOREIGN PATENT DOCUMENTS

| | | |
|---|---|---|
| DE | 102005042926 A1 | 3/2007 |
| DE | 102007015105 A1 | 10/2008 |

(Continued)

OTHER PUBLICATIONS

Notification of the First Office Action, The State Intellectual Property Office of the People's Republic of China for Application No. 201210062827.6 dated Feb. 25, 2014.

(Continued)

*Primary Examiner* — John Rivell
(74) *Attorney, Agent, or Firm* — Marshall, Gerstein & Borun LLP

(57) ABSTRACT

A method and a device for recycling compressed gas where the compressed gas used in a compressed gas consumer, particularly a container blow-molding machine, is fed back into a compressed gas generator. In order to increase the recycling volume, the compressed gas from the compressed gas consumer is collected separately and fed back to at least a first and a second pressure range of the pressure generator separately according to pressure stages.

18 Claims, 1 Drawing Sheet

(56) References Cited

U.S. PATENT DOCUMENTS

| | | | |
|---|---|---|---|
| 7,803,311 B2 * | 9/2010 | Finger et al. | 425/535 |
| 2004/0173949 A1 | 9/2004 | Storione et al. | |
| 2009/0193842 A1 * | 8/2009 | Tsukamoto et al. | 417/250 |
| 2012/0098165 A1 * | 4/2012 | Baumgarte et al. | 264/523 |

FOREIGN PATENT DOCUMENTS

| | | |
|---|---|---|
| EP | 1777056 A1 | 4/2007 |
| EP | 1974892 A2 | 10/2008 |
| EP | 2142830 B1 | 11/2010 |
| GB | 2431372 A | 4/2007 |
| WO | WO-2006024462 A2 | 3/2006 |
| WO | WO-2007028493 A2 | 3/2007 |
| WO | WO-2008/22311 A1 | 10/2008 |

OTHER PUBLICATIONS

German Search Report for 10 2011 005 189.9, dated Jan. 30, 2012.
Search report for EP 12 15 4911, dated Dec. 2, 2013.
Search report for EP 12 15 4911, dated Apr. 17, 2014.

* cited by examiner

METHOD AND DEVICE FOR RECYCLING COMPRESSED GAS

CROSS-REFERENCE TO RELATED APPLICATION

The present application claims the benefit of priority of German Application No. 102011005189.9, filed Mar. 7, 2011. The entire text of the priority application is incorporated herein by reference in its entirety.

FIELD OF THE DISCLOSURE

The disclosure relates to a method and a device for recycling compressed gas.

BACKGROUND

Such a method and such a device are known from DE 10 2005 042 926. In the known method, used compressed air from a hollow body manufacturing machine, for example, a stretch blow-molding machine, is fed back for reuse. Stretch blow-molding machines require a relatively high proportion of compressed air in order to blow up prefabricated and heated bottle preforms into finished containers. The air used for the blowing procedure has a pressure that is reduced after the blowing procedure, but this pressure is still relatively high. In order to prevent this pressure from being wasted, the compressed air is fed back into the pressure generator (compressor) after the containers have been blown. It is detrimental thereby that the return feed must take place at a certain minimum pressure in order to allow a feed in. It is consequently not possible to recycle all the compressed air that arises.

Because different processes are run in the blowing process of the stretch blow-molding machine, compressed air at different pressures arises, and of this air, only that portion that lies above the minimum pressure can be reused by the known method.

SUMMARY OF THE DISCLOSURE

One aspect of the disclosure is providing a method and a device for recycling compressed gas that are able to recycle a substantially higher proportion of compressed air at different pressures.

Compressed gases at a low pressure can also be recycled by the development according to the disclosure, so that altogether, a substantially higher recycling rate can be achieved.

The compressed air that is fed back is advantageously first collected before being fed into the pressure generator in order to keep the compressed feed-in essentially constant.

The feed of the compressed gas can take place at the widest range of points in the course of the pressurization process in the pressure generator, whereby a suitable point can be found for each pressure level that is fed back in. For example, the compressed gas with the lowest pressure is fed in before the first pressurization stage and a compressed gas with a higher pressure is fed in between the first and the second pressurization stages.

BRIEF DESCRIPTION OF THE DRAWINGS

Embodiments of the disclosure are explained in more detail in the following on the basis of the drawings. Shown are.

DETAILED DESCRIPTION OF THE PREFERRED EMBODIMENT

In the following, the disclosure is explained on the basis of a known stretch blow-molding method for manufacturing hollow bodies from plastic. These methods are carried out in a stretch blow-molding machine 1 that is depicted in the figures only schematically and by way of example, and they require compressed air, usually at different pressure levels; these are provided by one or more pressure generators 2.

Figure 1:
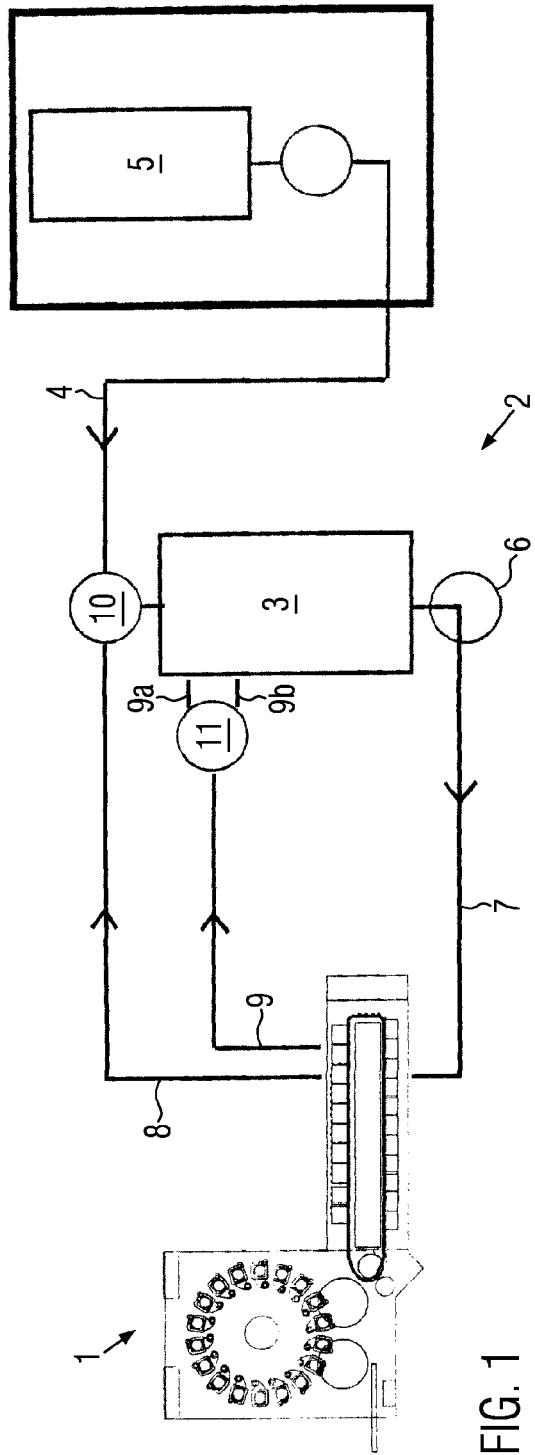
FIG. 1 a first embodiment of a device according to the disclosure.

In the embodiment according to FIG. 1, the pressure generator 2 contains a booster 3 that can be a reciprocating compressor or a turbocompressor. The booster 3 is supplied with pre-pressurized compressed gas, referred to in the following as compressed air, from a low pressure compressor 5 via a low pressure network. In the booster 3, the compressed air is then brought to the required pressure and conveyed to the stretch blow-molding machine 1 via a buffer tank 6 in the blow air line 7, whereby the compressed air is used in the stretch blow-molding machine 1 in the corresponding working processes.

Unlike in the state of the art where the compressed air volumes are altogether collected and fed back at the resulting mixed pressure, in this case after the end of the process, the individual compressed air volumes are fed back into the pressure generator 2 separately in various pressure stages according to the residual pressure via a plurality of return lines, i.e., at least a first return line 8 and a second return line 9. In the depicted embodiment, the compressed gas with the lower pressure stage, i.e., preferably 4 to 7 bar, is fed back through the return line 8 and compressed gas with the higher pressure level, i.e., for example 10 to 13 bar, is fed back through the second return line 9.

The first return line 8 thereby discharges into a buffer tank 10, into which the low pressure network 4 from the low pressure compressor 5 also discharges, which supplements the compressed gas volume lost at the compressed gas consumer 1. Recycled and "new" compressed gas, mixed, do not reach the booster 3 at any point before from this buffer tank 10, namely before its first pressurization stage.

The second return line 9 discharges into the booster 3 via a separate buffer tank 11, namely at a point in the pressurization process that is suitable for the pressure of the compressed gas that is fed back. Using the compressed air lines 9a and 9b, the buffer tank 11 is integrated into the compressor system 3 and serves hereby as a compressed air buffer for the internal compressed air control/regulation. The boiler serves as a buffer between the pressurization stages for guaranteeing the compressed air conditions in the compressor (regulation is consequently simplified) and also serves as a feeding point for the compressed air recycling. Because two pressurization stages of the compressor are hereby separated, there is a compressed air line 9a from the first pressurisation stage to the boiler 11 and from the boiler 11 to the next pressurization stage (line 9b). In the depicted embodiment, the second return line 9 can be introduced between the first and second pressurization stages of the booster 3. Further return lines in other areas of the pressurization process in the pressure generator 2 can be provided.

By controlling the pressure generator, the individual pressurisation stages are depressurized or pressurized depending on the quantity of returned compressed gas. In the case of an introduction between two pressurization stages, the preceding stages are designed in such a way that these can supply the maximum demand and there is a (partial) depressurization only when compressed gas is returned.

Although not depicted, all supply points are provided with the customary and required components, such as check valves, pressure measurements, shut-off cocks or the like. The buffer tanks act as a controlled section for the pressure hysteresis and can be dispensed with in the event of appropriate control of the pressure generation.

Figure 2:
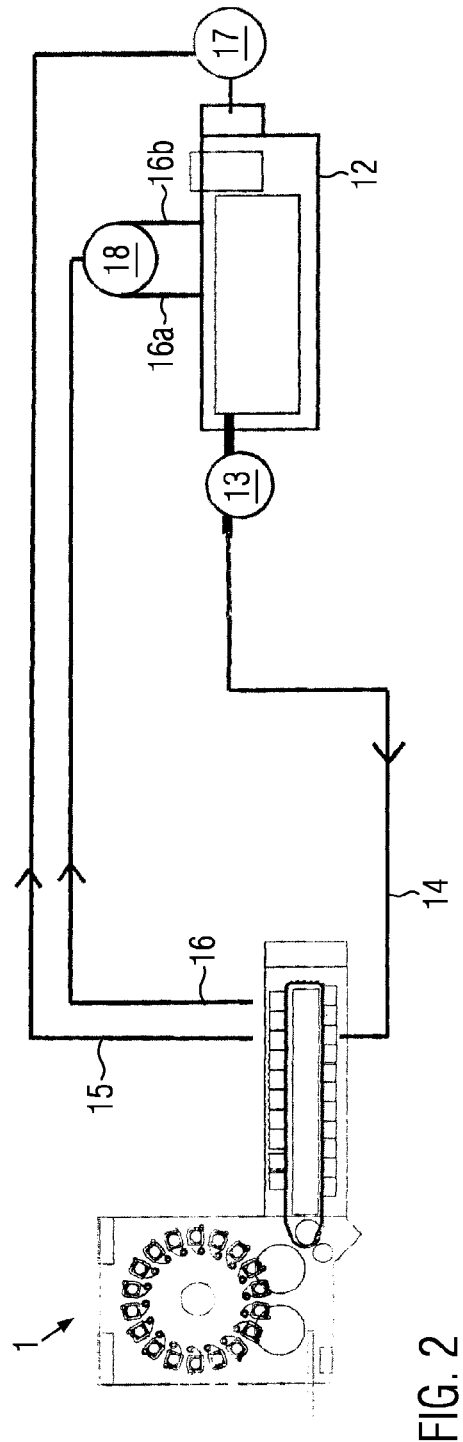
FIG. 2 a second embodiment of a device according to the disclosure.

FIG. 2 shows a device according to the disclosure, again using a stretch blow-molding machine 1 and a pressure generator 2, whereby the pressure generator here contains a standard compressor 12. The standard compressor 12 supplies compressed gas at the required pressure and conducts it into the compressed gas consumer in the form of the blow-molding machine 1 via a buffer tank 13 and a blow air line 14. The first stage of the standard compressor 12 can consist of a screw compressor, reciprocating compressor or turbocompressor. The remaining stages for the remaining compressing can, for example, be reciprocating compressors or turbocompressors.

The compressed air used for the respective working process in the pressure consumer, i.e., the blow-molding machine 1, is collected depending on the pressure (pressure stages) and conducted back into the appropriate pressurization stages of the pressure generator 2 via a plurality of return lines. In the depicted embodiment, a first return line 15 and a second return line 16 are provided. The first return line is used for returning compressed air at a low pressure, whereby this can lie at approximately 1 bar when an atmospheric pressure from compressing standard compressors is used. The first return line 15 discharges into a buffer tank 17 that is connected to the pressure generator 2 before the first compression stage.

The second return line 16 discharges in turn into the standard compressor 12 via a buffer tank 18 and two lines 16a, 16b connected to different pressurization stages (similarly to FIG. 1). Using the compressed air lines 16a and 16b, the buffer tank 18 is integrated into the compressor system 12 and hereby serves as a compressed air buffer for the internal compressed air control/regulation. Compressed gas in the pressure range between 10 and 13 bar can in turn be fed back via the second return line 16.

Here again, the buffers act as a controlled section for the pressure hysteresis and can be dispensed with in the event of appropriate control of the pressure generation. All supply points in FIG. 2 are also provided with check valves, pressure measurements, shut-off cocks, etc.

Both variants of FIGS. 1 and 2 can be operated in a similar manner. For example, in both cases, the compressed air that is to be recycled can be pumped into the respective tanks 10, 11 or 17, 18. If the recycling volume is too low, the pressure in the buffer tank drops so that additionally in the case of a feed before the pressure generator 2, compressed air from the low pressure network is removed, or in the case of a feed between the pressure stages of the pressure generator, the previously switched stage is switched from "depressurized" to "pressurized". This consequently results in a regulation by the compressor system and the recycling volume can be used optimally.

In modification of the described and drawn embodiments, the disclosure can be used with other pressure consumers and other pressure generators. The disclosure can also be used if a consumer is supplied with compressed air by a plurality of pressure generators or if a pressure generator supplies a plurality of consumers. The type of pressure generator is also non-critical.

The invention claimed is:

1. A method for recycling compressed gas wherein the compressed gas used in the blowing process of a container blow-molding machine is fed back into a compressed gas generator, comprising separately collecting the compressed gas from the container blow-molding machine according to pressure stages and, separated by pressure stages, feeding the separately collected compressed gas to at least a first and second pressure range of the pressure generator.

2. The method according to claim 1, and collecting the returned compressed gas before the feed into the pressure generator.

3. The method according to claim 1, and feeding in the compressed gas with the lowest pressure before the first pressurization stage of the pressure generator.

4. The method according to claim 1, and feeding in the compressed gas with the higher pressure between different pressurization stages of the pressure generator.

5. The method according to claim 1, and separately collecting the compressed gas from the container blow-molding machine according to pressure stages in a first and second buffer tank, and separated by pressure stages, feeding the separately collected compressed gas from the first buffer tank to a first pressure range of the pressure generator and from the second buffer tank to a second pressure range of the pressure generator.

6. The method according to claim 5, and supplementing the separately collected compressed gas at the first buffer tank with new compressed gas from a low pressure compressor.

7. A device for recycling compressed gas from a container blow-molding machine wherein the container blow-molding machine is connected to an output of a compressed gas generator via an air blow line and an input of a compressed gas generator via a return line, comprising at least two return lines are provided for returning compressed gas at different pressures to different pressure stages of the pressure generator.

8. The device according to claim 7, and wherein a collection tank for the returned compressed gas is provided in at least one of the two return lines.

9. The device according to claim 7, wherein a first of the at least two return lines discharges into the pressure generator before the first pressurization stage.

10. The device according to claim 9, and wherein a further return line discharges into the pressure generator between pressurization stages.

11. The device according to claim 7, and wherein a first buffer tank for the returned compressed gas is provided in a first of the at least two return lines and a second buffer tank for the returned compressed gas is provided in a second of the at least two return lines.

12. A method for recycling compressed gas wherein the compressed gas used in a compressed gas consumer is fed back into a compressed gas generator, comprising separately collecting the compressed gas from the compressed gas consumer according to pressure stages in a first and a second buffer tank and, separated by pressure stages, feeding the separately collected compressed gas from the first buffer tank to a first pressure range of the pressure generator and from the second buffer tank to a second pressure range of the pressure generator.

13. The method according to claim 12 and feeding in the compressed gas with the lowest pressure before the first pressurization stage of the pressure generator.

14. The method according to claim 12 and feeding in the compressed gas with the higher pressure between different pressurization stages of the pressure generator.

15. The method according to claim 12, where the gas consumer is a container blow-molding machine.

16. A device for recycling compressed gas from a compressed gas consumer, wherein the compressed gas consumer is connected to an input of a compressed gas generator via a return line comprising at least two return lines are provided for returning compressed gas at different pressures to different pressure stages of the pressure generator and wherein a first buffer tank for the returned compressed gas is provided in a first of the at least two return lines and a second buffer tank for the returned compressed gas is provided in a second of the at least two return lines.

17. The device according to claim 16, wherein a first of the two return lines discharges into the pressure generator before the first pressurization stage.

18. The device according to claim 16, and wherein a further return line discharges into the pressure generator between pressurization stages.

\* \* \* \* \*